US012640356B2

(12) United States Patent
Terui et al.

(10) Patent No.: US 12,640,356 B2
(45) Date of Patent: May 26, 2026

(54) ION SOURCE AND MASS SPECTROMETER INCLUDING THE SAME

(71) Applicant: HITACHI HIGH-TECH CORPORATION, Tokyo (JP)

(72) Inventors: Yasushi Terui, Tokyo (JP); Kantarou Maruoka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 345 days.

(21) Appl. No.: 18/037,111

(22) PCT Filed: Dec. 6, 2021

(86) PCT No.: PCT/JP2021/044797
§ 371 (c)(1),
(2) Date: May 16, 2023

(87) PCT Pub. No.: WO2022/131061
PCT Pub. Date: Jun. 23, 2022

(65) Prior Publication Data
US 2023/0420238 A1 Dec. 28, 2023

(30) Foreign Application Priority Data
Dec. 16, 2020 (JP) ................................. 2020-208212

(51) Int. Cl.
*H01J 49/04* (2006.01)
*G01N 30/72* (2006.01)
*G01N 30/02* (2006.01)

(52) U.S. Cl.
CPC .......... *H01J 49/0445* (2013.01); *G01N 30/72* (2013.01); *G01N 2030/027* (2013.01)

(58) Field of Classification Search
CPC ...... H01J 49/0445; H01J 49/145; H01J 49/24; H01J 49/045; H01J 49/14; G01N 30/72; G01N 2030/027
See application file for complete search history.

(56) References Cited

U.S. PATENT DOCUMENTS 5,485,016 A * 1/1996 Irie ..................... H01J 49/0422
250/281
2001/0013579 A1 8/2001 Andrien, Jr. et al.
(Continued)

FOREIGN PATENT DOCUMENTS

CN 103797559 A 5/2014
JP 2001-516140 A 9/2001
(Continued)

OTHER PUBLICATIONS

Carroll et al., "Atmospheric Pressure Ionization Mass Spectrometry: Corona Discharge Ion Source for Use in Liquid Chromatograph—Mass Spectrometer—Computer Analytical System", Analytical Chemistry, Apr. 21, 1975.
(Continued)

*Primary Examiner* — David E Smith
(74) *Attorney, Agent, or Firm* — Volpe Koenig

(57) ABSTRACT
An ion source includes: an atomizer configured to continuously introduce a liquid sample and atomize the liquid sample; a heating and mixing chamber configured to vaporize the atomized liquid sample; and a charge supply unit configured to ionize the vaporized liquid sample. The charge supply unit has a positive pressure with respect to the heating and mixing chamber. The vaporized liquid sample and a gaseous seed ion supplied from the charge supply unit are mixed in the heating and mixing chamber. An auxiliary gas for adjusting a gas flow rate in the heating and mixing chamber can be introduced into the heating and mixing chamber. The heating and mixing chamber has a chamber
(Continued)

outlet configured to introduce the ionized liquid sample into a mass spectrometer. The chamber outlet is connected to a first pore of the mass spectrometer.

3 Claims, 2 Drawing Sheets

(56) References Cited

U.S. PATENT DOCUMENTS

| | | | |
|---|---|---|---|
| 2004/0036020 A1* | 2/2004 | Sakairi | H01J 49/168 |
| | | | 250/288 |
| 2012/0312980 A1 | 12/2012 | Whitehouse | |
| 2013/0140453 A1 | 6/2013 | Verenchikov et al. | |
| 2017/0278688 A1 | 9/2017 | Verenchikov et al. | |

FOREIGN PATENT DOCUMENTS

| | | | |
|---|---|---|---|
| JP | 2013-541130 A | 11/2013 | |
| JP | 2017-527078 A | 9/2017 | |

OTHER PUBLICATIONS

Fenn et al., "Electrospray Ionization for Mass Spectrometry of Large Biomolecules", Science, Oct. 6, 1989.
International Search Report dated Feb. 7, 2022 for PCT International Application No. PCT/JP2021/044797.
Extended European Search Report issued on Oct. 9, 2024 for European Patent Application No. 21906424.3.
Chinese Office Action dated Dec. 12, 2025 for Chinese Patent Application No. 202180083602.6.

* cited by examiner

ION SOURCE AND MASS SPECTROMETER INCLUDING THE SAME

TECHNICAL FIELD

The present invention relates to an ion source and a mass spectrometer including the same.

BACKGROUND ART

Examples of a typical analyzer that analyzes a liquid sample in mass spectrometry include a liquid chromatograph mass spectrometer. The liquid sample fed out from a liquid chromatograph is ionized and introduced into the mass spectrometer, so that qualitative and quantitative measurements are performed. Examples of a typical ionization method include an atmospheric pressure ionization method (hereinafter referred to as an APCI method) (Non-PTL 1) and an electrospray ionization method (hereinafter referred to as an ESI method) (Non-PTL 2).

In the APCI method, first, a measurement sample is atomized. Since the measurement sample is continuously fed from the liquid chromatograph together with a solvent in an amount of about several µL/min to 1000 µL/min, an airflow-supported spray using nitrogen gas or the like is often used for atomization. Thereafter, an atomized sample is vaporized by heating, and the vaporized sample is introduced into corona discharge generated by a needle-shaped electrode and is ionized.

In the ESI method, similarly to the APCI method, the liquid sample is atomized by the airflow-supported spray, a high voltage is applied to an atomizer, and the fine spray is converted into charged liquid droplets. Alternatively, the high voltage is applied to the measurement sample itself to atomize the fine spray into charged liquid droplets. The charged liquid droplets are heated and dried and a size of the charged liquid droplets is reduced, and the excessive charge due to the reduction in the size of the charged liquid droplets has the ions released from the liquid droplets and ionized by Coulomb repulsion.

In the APCI method, a needle-shaped electrode is often used for generating corona discharge, and ionization efficiency depends on a tip shape and a surface state of the needle. In addition, since in the ESI, a high voltage is applied to the atomizer (outlet of the liquid) or the liquid sample itself, a state of ionization depends on a shape of the outlet of the atomizer from which the liquid is ejected. Therefore, for stable ionization, maintenance such as cleaning or replacement of a needle electrode for the APCI or the atomizer for the ESI is required.

CITATION LIST

Non Patent Literature

Non-PTL 1: "Atmospheric pressure ionization mass spectrometry. Corona discharge ion source for use in a liquid chromatograph-mass spectrometer-computer analytical system", D. I. Carroll, I. Dzidic, R. N. Stillwell, K. D. Haegele, and E. C. Horning, Anal. Chem., 47, 2369 (1975).
Non-PTL 2: "Electrospray ionization for mass spectrometry of large biomolecules" JB Fenn, M Mann, CK Meng, SF Wong, CM Whitehouse, Science, 6 Oct. 1989: Vol. 246, Issue 4926, pp. 64-71.

SUMMARY OF INVENTION

Technical Problem

The liquid chromatograph mass spectrometer requires atomization of the liquid sample, vaporization of an atomized fluid, application of a charge, and introduction into the mass spectrometer for measurement. In the current ESI and APCI methods, the airflow-supported spray is often used for atomization of a liquid. The airflow-supported spray is a method of atomizing by causing a high-speed gas to flow around a thin tube through which the sample liquid flows and bringing the liquid and the high-speed gas into contact with each other at an outlet of the thin tube. Here, the high-speed gas is referred to as an atomized gas.

A typical liquid delivery amount of the liquid chromatograph is several µL/min to 1000 µL/min, and the liquid is continuously fed. In order to atomize the continuously fed liquid, a flow rate of the atomized gas needs to be about several L/min. In the vaporization after atomization, the atomized fluid and a high-temperature gas are mixed, and the measurement sample and the solvent are dried. The high-temperature gas also flows at a flow rate of about several L/min to 20 L/min, and the gas of about 10 L/min, including the atomized gas, is required for atomization and vaporization of the measurement sample.

When a flow rate of the liquid sample after vaporization is about 1 mL/min, an amount of the atomized gas is 10 L/min. Therefore, the atomized gas becomes in a state of mixing with a gas having a volume of about 10,000 times. Therefore, there is a problem that, when the sample liquid is atomized, the measurement sample itself is diluted due to the atomized gas.

Further, when the liquid sample continuously fed at several µL/min to 1000 µL/min is atomized by the airflow-supported spray, a speed of the atomized gas flowing around the thin tube through which the liquid sample flows is a value close to a sound speed, and the measurement sample also moves at the same initial speed. In the mass spectrometer, the measurement sample itself is ionized and introduced into the device, and ions are guided to a detector using an electric field and a magnetic field and are detected. In the ESI and APCI methods, which are typical ionization methods for a liquid sample, the measurement sample is diluted at the time of ionization, and it is necessary to introduce a fairly high-speed fluid into the device. As a result, a small part of the measurement sample is introduced into the device, and sensitivity loss occurs.

An object of the invention is to provide an ion source capable of stabilizing the number of ions generated from a liquid measurement sample and introduced into a device, and a mass spectrometer including the ion source.

Solution to Problem

In order to solve the above object, for example, a configuration described in claims is adopted. The present application includes a plurality of means for solving the above object, and an example thereof is an ion source including: an atomizer configured to continuously introduce a liquid sample and atomize the liquid sample; a heating and mixing chamber configured to vaporize the atomized liquid sample; and a charge supply unit configured to ionize the vaporized liquid sample, in which the charge supply unit has a positive pressure with respect to the heating and mixing chamber, the vaporized liquid sample and a gaseous seed ion supplied from the charge supply unit are mixed in the heating and mixing chamber, an auxiliary gas for adjusting a gas flow rate in the heating and mixing chamber can be introduced into the heating and mixing chamber, the heating and mixing chamber has a chamber outlet configured to introduce the ionized liquid sample into a mass spectrometer, and the chamber outlet is connected to a first pore of the mass spectrometer.

Advantageous Effects of Invention

According to the invention, it is possible to provide an ion source capable of stabilizing the number of ions generated from a liquid measurement sample and introduced into a device, and a mass spectrometer including the ion source. Objects, configurations, and effects other than those described above will be clarified by the following description of an embodiment.

DESCRIPTION OF EMBODIMENTS

Hereinafter, an embodiment of the invention will be described with reference to the drawings.

Figure 1:
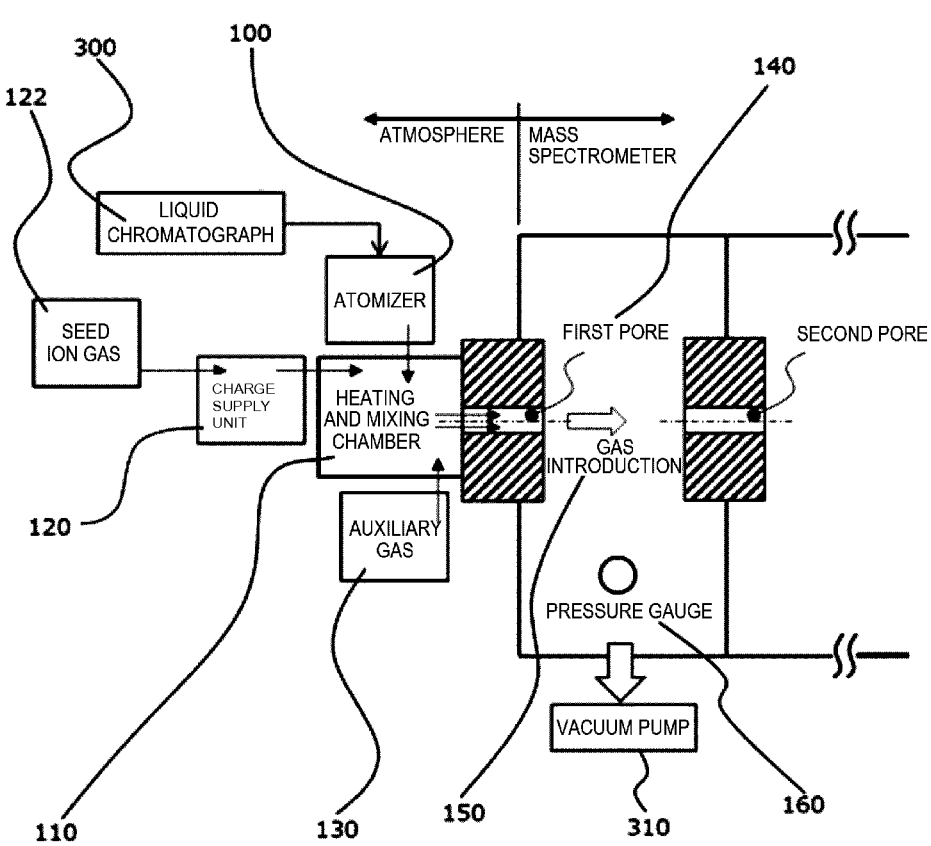
FIG. 1 is a configuration diagram of main parts of an embodiment.
Figure 2:
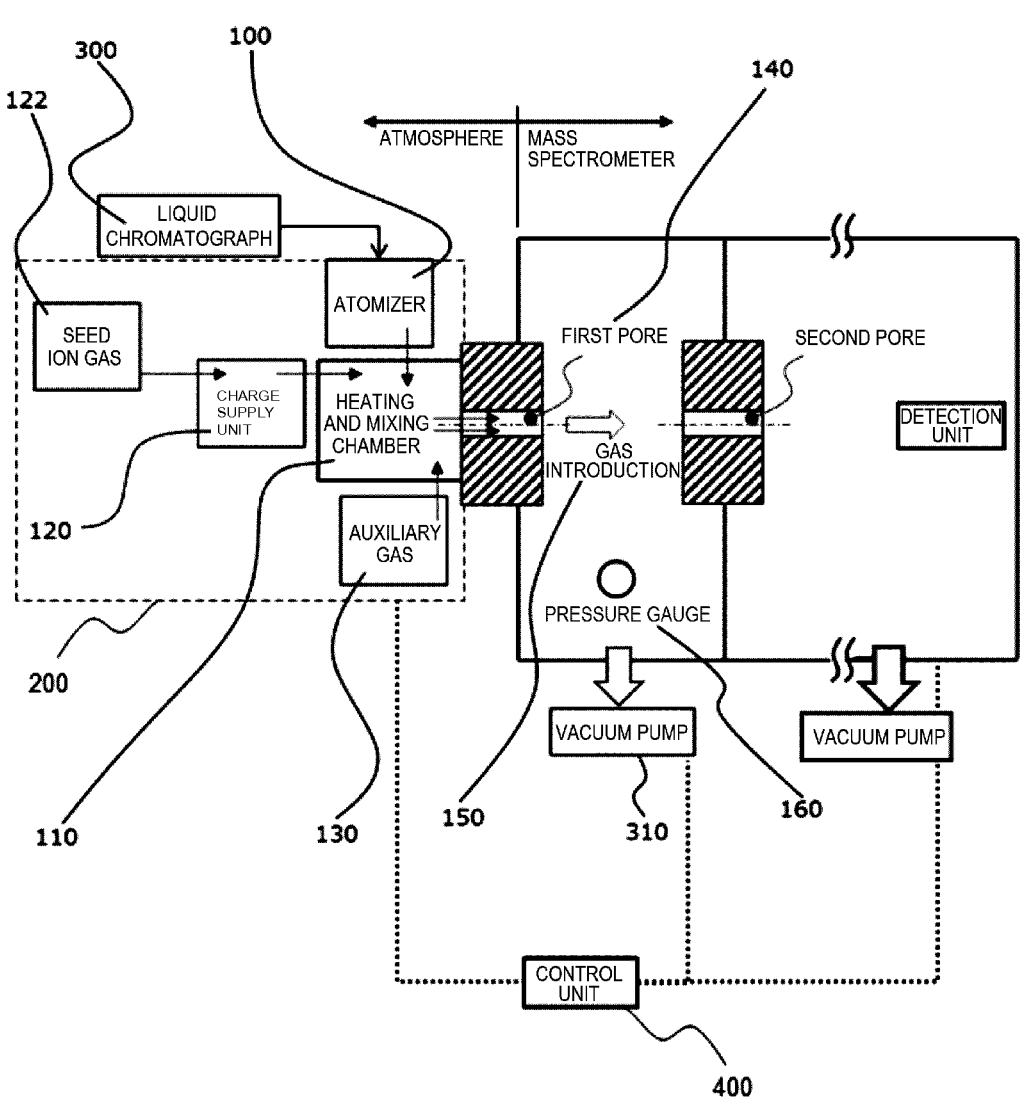
FIG. 2 is a schematic diagram of a whole of the embodiment.

FIG. 1 is a configuration diagram of main parts of the present embodiment, and FIG. 2 is a schematic diagram of a whole of the present embodiment.

Examples of a typical analyzer that analyzes a liquid sample include a liquid chromatograph mass spectrometer. A measurement sample is fed to an atomizer 100 by continuous feeding of about several μL/min to 1000 μL/min by a liquid chromatograph 300.

The atomizer 100 atomizes the liquid sample. Examples of a typical atomizer include a gas-supported spray that performs atomization by flowing a high-speed gas around a thin tube through which the liquid sample flows, and bringing the liquid sample and the high-speed gas into contact with each other at an outlet of the thin tube. As the high-speed gas, a nitrogen gas or air is generally used. Instead of the gas-supported spray, an ultrasonic atomizer used in a humidifier may be used.

In order to vaporize an atomized measurement sample fluid (atomized fluid), the atomized fluid is introduced into a heating and mixing chamber 110. The heating and mixing chamber 110 itself is heated by a heater or the like, and vaporization of the introduced atomized fluid is promoted by heat transfer from the heating and mixing chamber 110. As another heating method, the atomized fluid may be heated by generating an electric field for high-frequency heating in the heating and mixing chamber 110 or may be heated by a light source that generates infrared rays.

A charge supply unit 120 generates seed ions for applying a charge to the measurement sample fluid (vaporized fluid) vaporized in the heating and mixing chamber 110. The charge supply unit 120 has a positive pressure with respect to (a higher pressure than) the heating and mixing chamber 110 such that the vaporized fluid does not flow in. Specifically, a seed ion gas 122 that generates the seed ions is supplied to the charge supply unit 120 to generate a gas flow from the charge supply unit 120 to the heating and mixing chamber 110.

The seed ion gas 122 is air, nitrogen, He, Ne, Ar, Xe, or a mixed gas thereof. The charge supply unit 120 introduces the seed ion gas 122 into corona discharge by a needle electrode for an APCI, or generates the seed ions by plasma discharge using the seed ion gas 122.

A vaporized sample and the seed ions are mixed in the heating and mixing chamber 110, so that the measurement sample is ionized. Since the charge supply unit 120 has the positive pressure with respect to the heating and mixing chamber 110, a fluid derived from the measurement sample does not flow into the charge supply unit 120, and contamination derived from the measurement sample can be prevented. In addition, since the atomizer 100 has only a function of atomization and the charge supply unit 120 has only a function of charge supply, measurement stability is improved.

The ionized measurement sample passes through a hole called a first pore 140, and is introduced into a mass spectrometer. The heating and mixing chamber 110 is in contact with the first pore 140, and a temperature difference between the heating and mixing chamber 110 and the first pore 140 is reduced by the heat transfer.

In the mass spectrometer, the first pore 140 serves as an interface that separates atmosphere and vacuum from each other. A chamber (a vacuum chamber having the first pore 140) in the mass spectrometer having the first pore 140 is connected to a vacuum pump 310, and an amount of gas introduction 150 to the mass spectrometer is determined by an area and a length of the first pore 140 and an exhaust speed of the vacuum pump 310. Therefore, a gas supply amount of a measurement gas to the mass spectrometer based on a sum of a gas supply amount from the atomizer 100 and a gas supply amount from the charge supply unit 120 may be different from the amount of gas introduction 150 to the mass spectrometer by the vacuum pump 310.

In order to adjust the gas supply amount of the measurement gas to the mass spectrometer and the amount of gas introduction 150 to the mass spectrometer, an auxiliary gas 130 is supplied to the heating and mixing chamber. The auxiliary gas 130 is air, nitrogen, He, Ne, Ar, Xe, or a mixed gas thereof. A flow rate of the auxiliary gas 130 may be determined based on a difference between a sum of a flow rate of an introduced liquid and a flow rate of the seed ion gas 122 and a flow rate of a gas passing through the first pore 140, or may be determined based on a pressure of the vacuum chamber having the first pore 140. The pressure of the vacuum chamber having the first pore 140 is detected by, for example, a pressure gauge 160 provided in the vacuum chamber. By supplying the auxiliary gas 130, ionization that is less likely to be influenced by environmental conditions of the device is achieved.

As described above, the measurement sample ionized by an ion source 200 including the atomizer 100, the heating and mixing chamber 110, and the charge supply unit 120 is introduced into the mass spectrometer and measured by a detection unit of the mass spectrometer. The control described above may be performed by a single control unit 400, or may be performed by a plurality of control units having different mechanisms in charge of the control. The control unit may be assembled in the mass spectrometer or may be an external control device.

As described above, in the related art, in the ESI and APCI methods, which are typical ionization methods for the liquid sample, the measurement sample is diluted at the time of ionization, and it is necessary to introduce a fairly high-speed fluid into the device. As a result, a small part of the measurement sample is introduced into the device, and sensitivity loss occurs.

In the APCI method, an atomized measurement sample is heated and dried, and then introduced into the corona discharge generated by a needle-shaped electrode and ionized. A state of the corona discharge largely depends on a shape of a tip of the needle electrode and contamination. In addition, since the corona discharge occurs in the vicinity of the tip of the needle electrode, the atomized measurement sample is ionized by colliding with the needle electrode. Therefore, the tip of the needle electrode is contaminated due to the measurement sample itself, and a user needs to frequently clean or replace the needle electrode.

In the ESI method, in order to apply a charge to the liquid sample, a high voltage of about several kV is applied to the liquid sample itself or the atomizer. Therefore, atomization of the measurement sample and application of the high voltage are performed at an outlet of the atomizer. Therefore, for example, when a probe shape of the tip of the atomizer changes due to a salt or the like in the measurement sample, an application state of the high voltage to the measurement sample may change, and an ion intensity may change. When the salt is separated from the tip of the atomizer, the ion intensity may return, which may cause deterioration in measurement reproducibility.

The invention provides an atomizer that continuously introduces a liquid sample and that atomizes the liquid sample, and a heating and mixing chamber that vaporizes the atomized liquid sample. The vaporized sample and a gaseous seed ion supplied from a charge supply unit are mixed in the heating and mixing chamber without coming into contact with a fluid generated from the liquid sample by causing a charge supply unit that ionizes the vaporized sample to have a positive pressure. An auxiliary gas for adjusting a gas flow rate in the heating and mixing chamber can be introduced into the heating and mixing chamber. The heating and mixing chamber has a chamber outlet that introduces the ionized sample into a mass spectrometer. The chamber outlet is connected to a first pore of the mass spectrometer to introduce ionized sample liquid droplets into a mass spectrometer.

Accordingly, the charge supply unit for ionization has a positive pressure with respect to a gas pressure of a fluid vaporized after atomizing the liquid sample, so that a salt derived from the measurement sample, the remaining liquid, and the like do not come into contact with the charge supply unit, and thus seed ions necessary for ionization can be stably supplied. As a result, by separating the atomizer and the charge supply unit, the atomizer has only a function of atomizing the liquid sample, and the charge supply unit has only a function of supplying a charge to the measurement sample. An influence of a sample-derived fluid on the charge supply unit is reduced, and a frequency of maintenance such as cleaning or replacement of parts can be reduced. In addition, introduction of the auxiliary gas reduces an influence of ionization of the measurement sample due to the environmental conditions of the device, and can stabilize ionization of a target measurement species.

The invention is not limited to the above embodiment, and includes various modifications. For example, the above embodiment has been described in detail for easy understanding of the invention, and the invention is not necessarily limited to those including all of the configurations described above.

REFERENCE SIGNS LIST

100: atomizer
110: heating and mixing chamber

120: charge supply unit
122: seed ion gas
130: auxiliary gas
140: first pore
150: gas introduction into mass spectrometer
160: pressure gauge
200: ion source
300: liquid chromatograph
310: pump
400: control unit

The invention claimed is:

1. A mass spectrometer comprising:
a control unit; and
an ion source including:
    an atomizer configured to continuously introduce a liquid sample and atomize the liquid sample,
    a heating and mixing chamber configured to vaporize the atomized liquid sample, and
    a charge supply unit configured to ionize the vaporized liquid sample, wherein
        the charge supply unit has a positive pressure with respect to the heating and mixing chamber,
        the vaporized liquid sample and a gaseous seed ion supplied from the charge supply unit are mixed in the heating and mixing chamber,
        an auxiliary gas for adjusting a gas flow rate in the heating and mixing chamber can be introduced into the heating and mixing chamber,
        the heating and mixing chamber has a chamber outlet configured to introduce the ionized liquid sample into a mass spectrometer,
        the chamber outlet is connected to a first pore of the mass spectrometer, and
        the heating and mixing chamber and the first pore are in contact with each other, and heat can be transferred between the heating and mixing chamber and the first pore, and
wherein the control unit determines a flow rate of the auxiliary gas based on a difference between a sum of a flow rate of the liquid sample introduced into the atomizer and a flow rate of a seed ion gas supplied to the charge supply unit and a flow rate of a gas passing through the first pore.

2. The mass spectrometer according to claim 1, further comprising:
a pressure sensor configured to detect a pressure of a vacuum chamber having the first pore, and
wherein the control unit controls a flow rate of the auxiliary gas based on a pressure of the vacuum chamber.

3. A mass spectrometer comprising:
a control unit;
a pressure sensor configured to detect a pressure of a vacuum chamber having a first pore; and
an ion source including:
    an atomizer configured to continuously introduce a liquid sample and atomize the liquid sample,
    a heating and mixing chamber configured to vaporize the atomized liquid sample, and
    a charge supply unit configured to ionize the vaporized liquid sample, wherein
        the charge supply unit has a positive pressure with respect to the heating and mixing chamber,
        the vaporized liquid sample and a gaseous seed ion supplied from the charge supply unit are mixed in the heating and mixing chamber, an auxiliary gas for adjusting a gas flow rate in the heating and mixing chamber can be introduced into the heating and mixing chamber, the heating and mixing chamber has a chamber outlet configured to introduce the ionized liquid sample into a mass spectrometer, the chamber outlet is connected to a first pore of the mass spectrometer, and the heating and mixing chamber and the first pore are in contact with each other, and heat can be transferred between the heating and mixing chamber and the first pore, and wherein the control unit controls a flow rate of the auxiliary gas based on a pressure of the vacuum chamber.

* * * * *